United States Patent
Kuang et al.

(10) Patent No.: US 12,434,719 B2
(45) Date of Patent: Oct. 7, 2025

(54) ENHANCED VEHICLE ACTIVATION

(71) Applicant: Ford Global Technologies, LLC, Dearborn, MI (US)

(72) Inventors: Ming Lang Kuang, Canton, MI (US); Mark Douglas Malone, Canton, MI (US); Daniel M. King, Northville, MI (US); Yuming Niu, Northville, MI (US); David Celinske, Wolverine Lake, MI (US); Scott J. Lauffer, Northville, MI (US); Ray Siciak, Ann Arbor, MI (US); John David Jorgensen, Carleton, MI (US); Jayeshkumar Ramani, Taylor, MI (US); Suvrat Jain, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1321 days.

(21) Appl. No.: 16/659,117

(22) Filed: Oct. 21, 2019

(65) Prior Publication Data
US 2021/0114605 A1     Apr. 22, 2021

(51) Int. Cl.
| | |
|---|---|
| *B60W 50/02* | (2012.01) |
| *B60W 10/04* | (2006.01) |
| *B60W 30/192* | (2012.01) |
| *B60W 40/08* | (2012.01) |
| *G07C 5/00* | (2006.01) |
| *G07C 5/08* | (2006.01) |

(52) U.S. Cl.
CPC ........ *B60W 50/0205* (2013.01); *B60W 10/04* (2013.01); *B60W 30/192* (2013.01); *B60W 40/08* (2013.01); *G07C 5/008* (2013.01); *G07C 5/0808* (2013.01)

(58) Field of Classification Search
CPC .......... B60W 50/0205; B60W 30/192; B60W 40/08; B60W 10/04; B60W 60/0059; B60W 50/00; B60W 2050/0043; G07C 5/0808; G07C 5/008; G07C 9/00174; G07C 5/0841; G07C 5/0816; F02N 2200/08; F02N 2300/00; F02N 2300/30; F02N 2300/304
USPC ............... 701/2, 29.1, 29.2, 29.3, 31.5, 113; 340/426.13, 426.15, 426.16, 426.17
See application file for complete search history.

(56) References Cited

U.S. PATENT DOCUMENTS

| | | |
|---|---|---|
| 7,650,210 B2 | 1/2010 | Breed |
| 9,946,890 B2 | 4/2018 | Valasek et al. |
| (Continued) | | |

FOREIGN PATENT DOCUMENTS

| | | |
|---|---|---|
| CN | 105799638 A | 7/2016 |
| CN | 109484356 A | 3/2019 |
| DE | 102014204533 A1 | 10/2015 |

*Primary Examiner* — Ramon A. Mercado
*Assistant Examiner* — Ellis B. Ramirez
(74) *Attorney, Agent, or Firm* — Frank A. MacKenzie; Brooks Kushman P.C.

(57) ABSTRACT

A computer includes a processor and a memory, the memory storing instructions executable by the processor to receive a request to activate a vehicle, receive diagnostic data for one or more vehicle components from an activation component, arbitrate the request and the diagnostic data to identify an activation mode of the vehicle that is one of an unpowered mode, a power-up mode, or a fully-started mode, and instruct the activation component to activate one or more vehicle components associated with the identified activation mode.

20 Claims, 4 Drawing Sheets

(56) References Cited

U.S. PATENT DOCUMENTS

| | | | |
|---|---|---|---|
| 10,328,897 B1* | 6/2019 | Nabbe | G06F 21/305 |
| 2008/0258890 A1 | 10/2008 | Follmer et al. | |
| 2012/0221173 A1* | 8/2012 | Ampunan | H04W 4/48 |
| | | | 701/2 |
| 2015/0175070 A1* | 6/2015 | Attard | B60W 60/0053 |
| | | | 340/439 |
| 2016/0311385 A1* | 10/2016 | Wojcik | B60R 16/03 |
| 2017/0291540 A1* | 10/2017 | Caveney | B60Q 5/005 |
| 2018/0003142 A1* | 1/2018 | Holub | B60R 16/033 |
| 2018/0061147 A1 | 3/2018 | Bergmann | |
| 2018/0115809 A1* | 4/2018 | Camacho | H04Q 9/00 |
| 2018/0298865 A1* | 10/2018 | Tamane | F02N 11/101 |
| 2018/0304836 A1* | 10/2018 | DeCia | B60H 1/00778 |
| 2019/0176752 A1* | 6/2019 | Cermak | B60R 25/33 |
| 2019/0354114 A1* | 11/2019 | Goldman | G05D 1/0297 |

\* cited by examiner

ENHANCED VEHICLE ACTIVATION

BACKGROUND

Vehicles can receive requests to activate from an unpowered state. During activation, one or more components, such as a propulsion, draw power from a power supply to prepare for actuation by a user to move the vehicle. Upon activation, the user can actuate the components to operate the vehicle. When the user has completed operation of the vehicle, the vehicle can receive a request to return to the unpowered state.

DETAILED DESCRIPTION

A computer includes a processor and a memory, the memory storing instructions executable by the processor to receive a request to activate a vehicle, receive diagnostic data for one or more vehicle components from an activation component, arbitrate the request and the diagnostic data to identify an activation mode of the vehicle that is one of an unpowered mode, a power-up mode, or a fully-started mode, and instruct the activation component to activate one or more vehicle components associated with the identified activation mode.

The instructions can further include instructions to, upon activating the vehicle in the fully-started mode, arbitrate the diagnostic data to identify an operation mode of the vehicle that is one of a manual mode, an autonomous mode, or a stopped mode.

The instructions can further include instructions to operate the vehicle in the stopped mode and, then, to arbitrate the diagnostic data to identify a second operation mode of the vehicle that is one of the manual mode or the autonomous mode.

The instructions can further include instructions to transition from the manual mode or the autonomous mode to the stopped mode.

The instructions can further include instructions to identify the activation mode based on received data from at least one of a virtual driving controller or an occupancy sensor.

The instructions can further include instructions to identify a fault in one of the vehicle components based on the diagnostic data.

The instructions can further include instructions to, upon activating the vehicle in the power-up mode, perform a diagnostic test of one or more vehicle components and, based on the diagnostic test, identify an operation mode of the vehicle that is one of a manual mode, an autonomous mode, or a stopped mode.

The instructions to arbitrate the request and the diagnostic data can further include instructions to identify the unpowered mode and to ignore the request when the diagnostic data indicate a fault in one or more vehicle components.

The instructions to arbitrate the request and the diagnostic data can further include instructions to identify the power-up mode when the diagnostic data indicate no fault in the vehicle components.

The instructions to arbitrate the request and the diagnostic data can further include instructions to identify the fully-started mode when the activation component indicates that a powertrain is operational.

The instructions to arbitrate the request and the diagnostic data can further include instructions to identify the fully-started mode when the diagnostic data indicate that a propulsion power supply is operational.

A method includes receiving a request to activate a vehicle, receiving diagnostic data for one or more vehicle components from an activation component, arbitrating the request and the diagnostic data to identify an activation mode of the vehicle that is one of an unpowered mode, a power-up mode, or a fully-started mode, and instructing the activation component to activate one or more vehicle components associated with the identified activation mode.

The method can further include, upon activating the vehicle in the fully-started mode, arbitrating the diagnostic data to identify an operation mode of the vehicle that is one of a manual mode, an autonomous mode, or a stopped mode.

The method can further include operating the vehicle in the stopped mode and, then, arbitrating the diagnostic data to identify a second operation mode of the vehicle that is one of the manual mode or the autonomous mode.

The method can further include transitioning from the manual mode or the autonomous mode to the stopped mode.

The method can further include identifying the activation mode based on received data from at least one of a virtual driving controller or an occupancy sensor.

The method can further include identifying a fault in one of the vehicle components based on the diagnostic data.

The method can further include, upon activating the vehicle in the power-up mode, performing a diagnostic test of one or more vehicle components and, based on the diagnostic test, identifying an operation mode of the vehicle that is one of a manual mode, an autonomous mode, or a stopped mode.

The method can further include identifying the unpowered mode and ignoring the request when the diagnostic data indicate a fault in one or more vehicle components.

The method can further include identifying the power-up mode when the diagnostic data indicate no fault in the vehicle components.

The method can further include identifying the fully-started mode when the activation component indicates that a powertrain is operational.

The method can further include identifying the fully-started mode when the diagnostic data indicate that a propulsion power supply is operational.

A system includes a vehicle activation component, a virtual driver controller, one or more vehicle motion controllers, a remote device, and means for arbitrating an activation request from the remote device and diagnostic data from the vehicle activation component and the vehicle motion controller.

The system can further include means for identifying an activation mode of the vehicle based on the arbitrated activation request, wherein the activation mode is one of an unpowered mode, a power-up mode, or a fully-started mode.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

During startup and shutdown of a vehicle, a plurality of components are activated and deactivated to prepare the vehicle for operation or to power down the vehicle. The components may require diagnostic testing to confirm that the components are operational prior to startup or shutdown. For example, during startup, a brake-by-wire component and a steer-by-wire component, which can be used during autonomous operation of the vehicle, require diagnostic testing to ensure that the components have not experienced a fault and are operational to brake and steer the vehicle. A dedicated portion of a vehicle computer that arbitrates and manages signals between vehicle components during startup and shutdown can specify an activation mode and an operation mode of the vehicle, providing an architecture that can accommodate different component configurations and designs.

Figure 1:
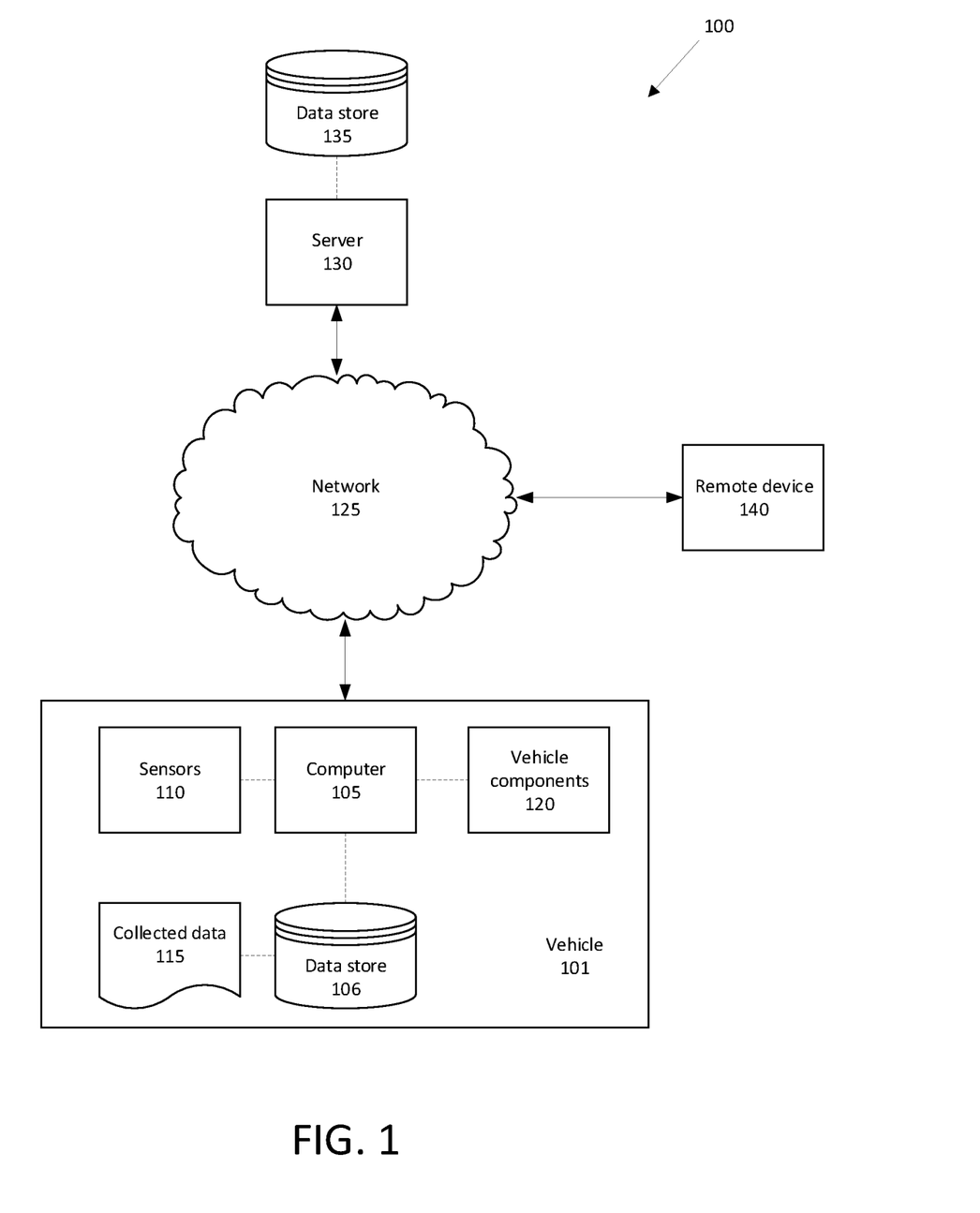
FIG. 1 is a block diagram of an example system for operating a vehicle.

FIG. 1 illustrates an example system 100 for operating a vehicle 101. A computer 105 in the vehicle 101 is programmed to receive collected data 115 from one or more sensors 110. For example, vehicle 101 data 115 may include a location of the vehicle 101, data about an environment around a vehicle, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The system can include a remote device 140. The remote device 140 can be any one of a variety of computing devices including a processor and a memory. For example, the remote device 140 can be a portable device such as a keyfob, a smartphone, a tablet, a personal digital assistant, a watch, a smart watch, a vibrating apparatus, etc. that includes capabilities for wireless communications using IEEE 802.11, Bluetooth®, and/or cellular communications protocols. Further, the remote device 140 may use such communications capabilities to communicate directly with the computer 105, e.g., using Bluetooth®.

Figure 2:
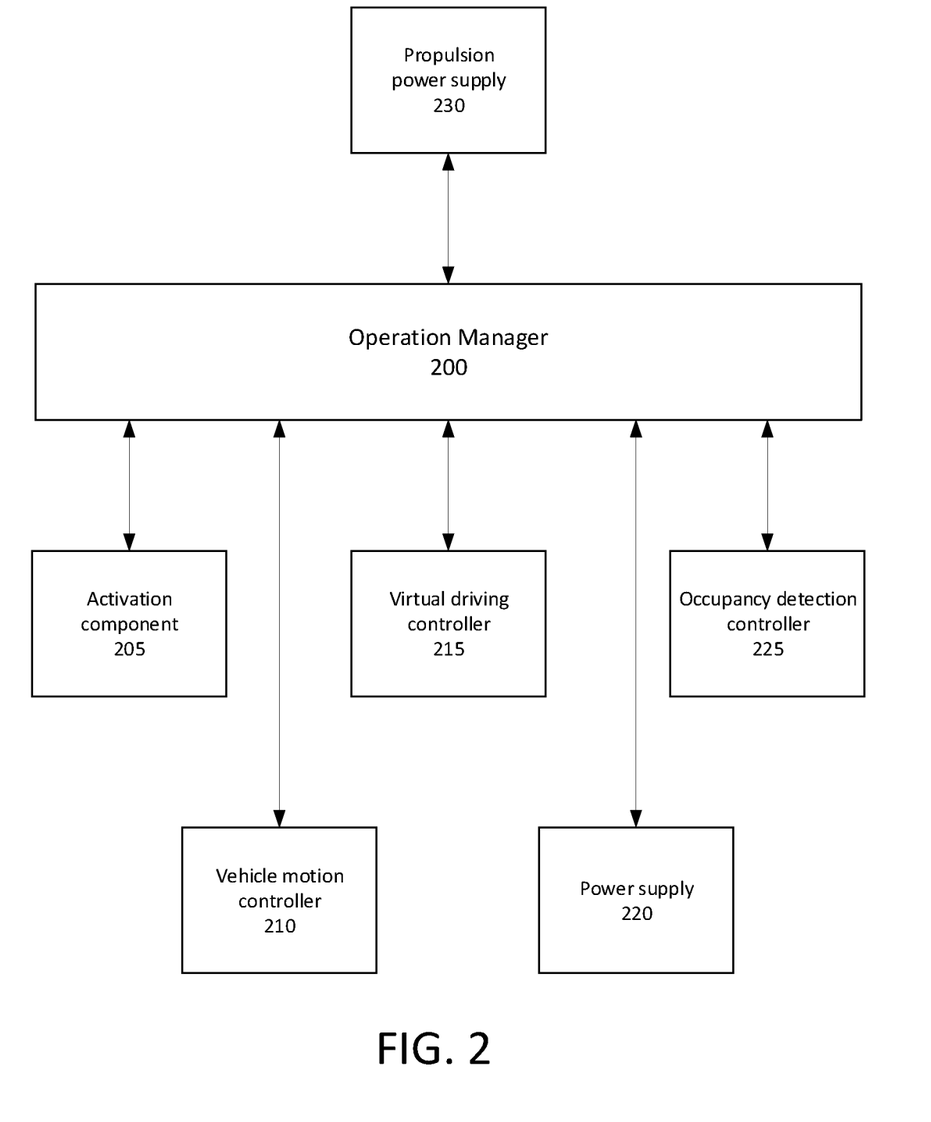
FIG. 2 is a block diagram of an example computer of the vehicle.

FIG. 2 is a block diagram of an operation manager 200 of the computer 105. The operation manager 200 is programming of the computer 105 that arbitrates data from one or more vehicle components 120 over the network 125 to operate the vehicle 101. In this context, to "arbitrate" means to receive more than one set of data and to provide an instruction according to one of the sets of data, and excluding as a basis, i.e., not according to, any of the other sets of data. For example, the operation manager 200 can receive a request from a remote device 140 with an instruction to begin startup of the vehicle 101 and a second request from a component 120 with data indicating a fault in the component 120. The operation manager 200 arbitrates the requests by determining whether to follow the instruction from the remote device 140 to begin startup of the vehicle 101 or to use the fault data from the component 120 to transition the vehicle 101 to an unpowered mode, as described below. That is, the operation manager 200 allows the computer to arbitrate instructions from, e.g., components 120, the server 130, the remote device 140, etc. The operation manager 200 can control startup and shutdown of the vehicle 101. Alternatively, the operation manager 200 can be programming of a dedicated electronic control unit (ECU) in communication with the computer 105, the components 120, the server 130, and/or the remote device 140. An "electronic control unit" is a device including a processor and a memory that includes programming to control one or more components 120. The ECU can communicate with other ECUs over the network 125.

The vehicle 101 includes an activation component 205. The activation component 205 is an ECU that includes programming to instruct components 120 to activate the vehicle 101 in an activation mode. Alternatively, the activation component 205 can be programming of the computer 105 to manage startup and shutdown of the vehicle 101. In this context, an "activation mode" is a mode specifying a power state of specific components 120 during startup of the vehicle 101, e.g., unpowered, powered with a specific power supply, etc. The activation mode can be one of an unpowered mode, a power-up mode, and a fully-started mode. In the unpowered mode, the computer 105 and components 120 can be substantially powered off to conserve energy when the vehicle 101 is not in use. The vehicle 101 can remain in the unpowered mode until the computer 105 receives an activation request, e.g., from the remote device 140. An "activation request" is a request to initiate startup of the vehicle 101, i.e., to transition from the unpowered mode to the fully-started mode. In the power-up mode, the computer 105 actuates one or more components 120 to prepare for operation of the vehicle 101. For example, the computer 105 can actuate a power supply 220, as described below, to provide electricity to other components 120. In the fully-started mode, all components 120 are available to be actuated by the computer 105 to operate in one of the operation modes described below. The operation manager 200 can arbitrate instructions from the activation component 205 to determine the activation mode for the vehicle 101.

The vehicle 101 includes a vehicle motion controller 210. A "vehicle motion controller" is one or more ECUs that control components 210 that control or can change motion of the vehicle 101. Example vehicle motion controllers 210 include, e.g., a steering system, a brake system, a fuel injector, a powertrain controller, a propulsion controller, etc. The operation manager 200 can arbitrate instructions from the vehicle motion controller 210 to determine actuation of the components 120 controlled by the vehicle motion controller 210. The vehicle motion controller 210 can be programming of the computer 105. Alternatively, the vehicle motion controller can be a dedicated ECU that communicates with the ECUs of the components 120 and the computer 105.

The vehicle 101 can include a virtual driving controller 215. The virtual driving controller 215 is one or more ECUs that are programmed to control the vehicle 101 in the autonomous and the semi-autonomous modes. Alternatively, the virtual driving controller 215 can be programming of the computer 105 to control the vehicle 101 in the autonomous and the semi-autonomous modes. The virtual driving controller 215 instructs the vehicle motion controller 210 to operate the components 120 to move the vehicle 101. That is, the virtual driving controller 215 can instruct the vehicle motion controller 210 according to a prescribed operation mode, as described below, to move the vehicle from an origin to a destination. For example, the virtual driving controller 215 can actuate a propulsion 120 to accelerate the vehicle 101. The operation manager 200 can arbitrate instructions from the virtual driving controller 215 to specify an operation mode for the vehicle 101.

The vehicle 101 includes a power supply 220. The power supply 220 provides electricity to one or more components 120. The power supply 220 can include one or more batteries, e.g., 12-volt lithium-ion batteries, and one or more power networks to supply power from the batteries to the components 120. The operation manager 200 can arbitrate instructions from the activation component 205, the vehicle motion controller 210, and/or the virtual driving controller 215 to actuate the power supply 220.

The vehicle 101 can include an occupancy detection controller 225. The occupancy detection controller 225 provides instructions to one or more ECUs of sensors 110 and/or components 120 to detect users occupying a passenger cabin of the vehicle 101. The occupancy detection controller 225 can be programming of the computer 105. Alternatively, the occupancy detection controller 225 can be a dedicated ECU. The occupancy detection controller 225 can instruct one or more occupancy sensors 110, e.g., cameras, microphones, etc., that can identify users in the passenger cabin. The operation manager 200 can instruct the occupancy detection controller 225 to identify the presence and readiness of users in the passenger cabin to determine the operation mode of the vehicle 101, as described below. For example, the operation manager 200 can receive from the occupancy detection controller 225 an identification of a user ready to assume manual control of the vehicle 101 and instruct the virtual driving controller 215 to operate the vehicle 101 in the manual mode.

The vehicle 101 can include a propulsion power supply 230. The propulsion power supply 230 provides power to the propulsion 120 and one or more other components 120 to propel the vehicle 101. For example, in a hybrid electric vehicle 101, the propulsion power supply 230 includes one or more batteries that supply electricity to an electric motor of the propulsion 120, e.g., a 300-volt lithium-ion battery, one or more power networks to supply power from the battery to the propulsion 120, and an internal combustion engine. In another example, the propulsion power supply 230 can be the internal combustion engine in a vehicle 101 without an electric motor to provide power to the propulsion 120. In yet another example, in a fully-electric vehicle 101, the propulsion power supply 230 can be the one or more batteries that supply electricity to the electric motor of the propulsion 120.

Figure 3:
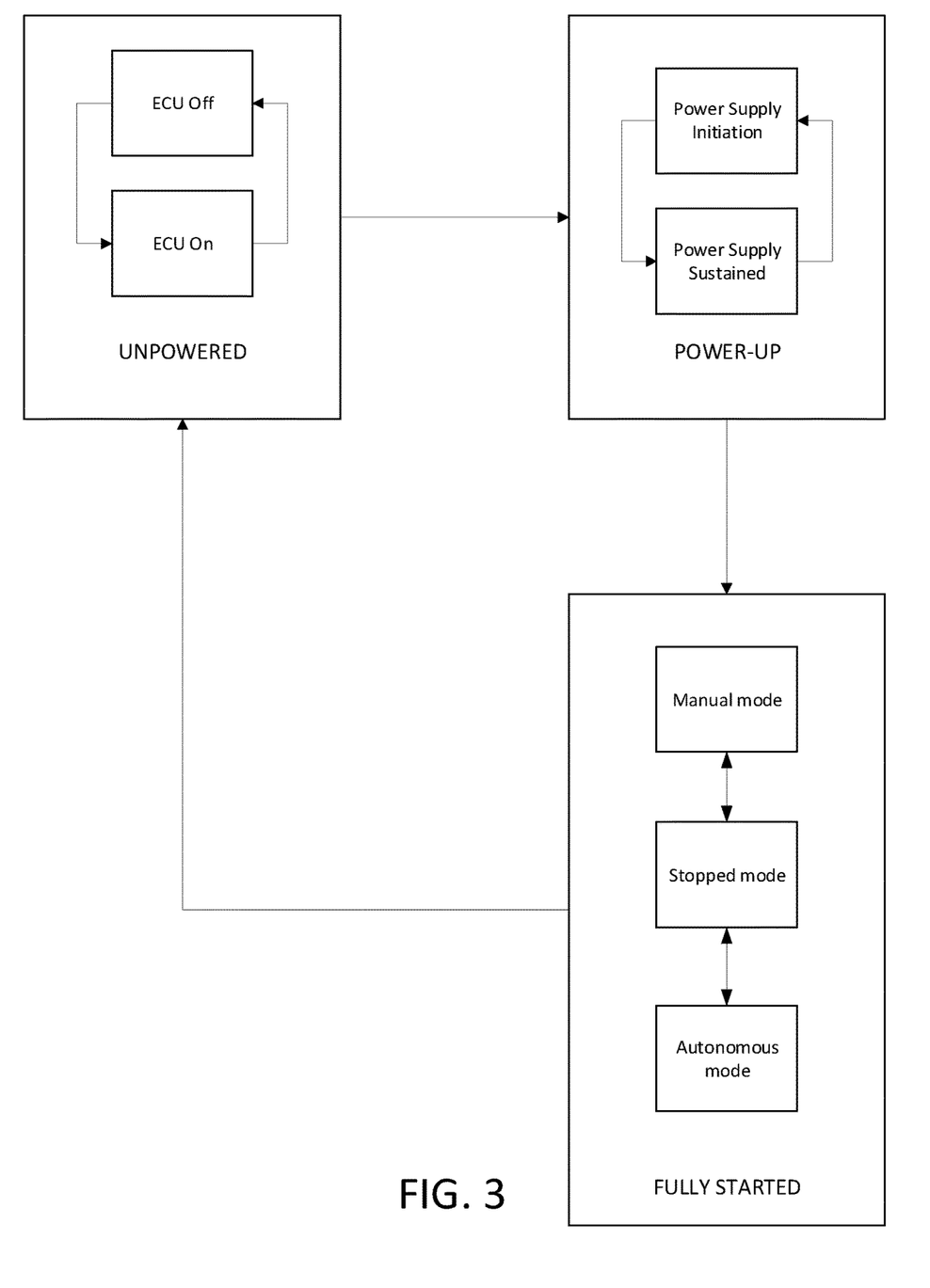
FIG. 3 is a state diagram of example activation modes of the vehicle.

FIG. 3 is a state diagram of the activation modes and the operation modes of the vehicle 101. Upon receiving a request from the server 130 and/or the remote device 140 to start the vehicle 101, the operation manager 200 instructs the activation component 205 to collect diagnostic data from one or more components 120, e.g., the vehicle motion controllers 210, the occupancy detection controller 225, etc., to determine whether to initiate startup of the vehicle 101.

The activation component 205 can instruct each component 120 to perform a diagnostic test to determine whether the component 120 is capable of operation, i.e., can operate within specified parameters, e.g., specified by a vehicle and/or component 120 manufacturer. That is, the ECU of each component 120 can perform a conventional self-diagnostic test to detect faults in the component 120 to confirm that the component 120 is operational. For example, the diagnostic test can include determining whether each power network of the component 120 is capable of transferring electricity from the power supply 220 to other portions of the component 120. If the component 120 is not capable of operation (e.g., a wire is shorted), the diagnostic test can output a "fault," and the activation component 205 can determine that identify the fault in the component 120. That is, if the activation component 205 identifies a "fault" in a component 120, the diagnostic data indicate that the component 120 is not capable of operation and require repair or replacement. When the activation component 205 identifies a fault, the operation manager 200 identifies the unpowered mode, as described below, as the activation mode, and the operation manager 200 instructs the activation component 205 to transition to or remain in the unpowered mode. By arbitrating the diagnostic data and the request, the operation manager 200 determines whether the vehicle 101 is capable of startup in response to the request. The activation component 205 can receive diagnostic data from, e.g., the vehicle motion controller 210, the virtual driving controller 215, the power supply 220, the occupancy detection controller 225, etc.

As described above, the vehicle 101 begins in the unpowered mode. In the unpowered mode, the components 120 are substantially powered off, i.e., the components 120 do not draw power from the power supply 220 other than components 120 necessary to receive messages over the network 125 to begin a startup procedure. As described above, each component 120 includes an ECU that controls operation of the components 120. In the example of FIG. 3, the "ECU" represents one or more of the ECUs of components 120 necessary to transition the vehicle 101 from the unpowered mode to the power-up mode. That is, as described below, the activation component 205 can transition each of the ECUs from an "ECU Off" state to an "ECU On" state during the startup procedure.

Upon collecting the diagnostic data, the operation manager 200 can arbitrate the received activation request and the diagnostic data to identify an activation mode. Upon identifying the activation mode, the operation manager 200 can instruct the activation component 205 to transition to the identified activation mode. For example, the operation manager 200 can instruct the activation component 205 to transition from the unpowered mode to the power-up mode. In the power-up mode, the activation component 205 instructs the ECUs to transition from the "ECU Off" state to the "ECU On" state. In the "ECU Off" state, the ECUs do not provide instructions to one or more components 120 but can receive instructions from the server 130 and/or the remote device 140. In the "ECU Off" state, the ECUs draw little to no power from the power supply 220. In the "ECU On" state, the ECUs draw additional power from the power supply 220 and the computer 105 transitions the vehicle 101 into the power-up mode. That is, in the power-up mode, the ECUs draw power from the power supply 220 in preparation to actuate the components 120.

In the power-up mode, the operation manager 200 instructs the activation component 205 to begin actuation of one or more components 120 to prepare the vehicle 101 for operation. The activation component 205 can instruct the vehicle motion controller 210 and the virtual driving controller 215 to draw power from the power supply 220, providing power to components 120 to move the vehicle 101 upon instruction from the virtual driving controller 215 and/or the operation manager 200. In the power-up mode, the power supply 220 starts in a "Power Supply Initiation" state. In the "Power Supply Initiation" state, the operation manager 200 instructs the components 120 to draw power from the power supply 220 until the operation manager 200 determines whether to actuate the propulsion power supply 230. That is, the operation manager 200 can determine to continue in the power-up mode until data from one or more diagnostic tests indicate that the components 120 are ready for actuation, as described above. Upon determining that the diagnostic data indicate no faults in the component 120, the operation manager 200 instructs the power supply 220 to continue to supply power and instructs the propulsion power supply 230 to supply power to the propulsion 120. Upon determining to instruct the propulsion power supply 230 to supply power, the operation manager 200 can instruct the power supply 220 to transition to the "Power Supply Sustained" state, i.e., to sustain supply power to one or more components 120. When the power supply 220 is in the "Power Supply Sustained" state, the operation manager 200 can instruct the activation component 205 to transition from the power-up mode to the fully-started mode.

In the fully-started mode, the activation component 205 instructs the propulsion 120 to draw power from the propulsion power supply 230 to prepare to move the vehicle 101. The activation component 205 instructs additional components 120 to draw power from the power supply 220 and/or the propulsion power supply 230, e.g., a brake, a steering motor, an entertainment component, etc. The activation component 205 can activate one or more sensors 110 to collect data 115. That is, in the fully-started mode, the activation component 205 activates the sensors 110 and the components 120 necessary for movement and other operation of the vehicle 101, e.g., the propulsion 120, the brake 120, the steering motor 120, the powertrain 120, etc.

The operation manager 200 can identify an operation mode of the vehicle 101. The operation mode can be one of a manual mode, an autonomous mode, or a stopped mode. As described above, the "autonomous" mode is a fully autonomous mode, i.e., a mode in which each of vehicle 101 propulsion (typically via a powertrain including an electric motor and/or internal combustion engine), braking, and steering are controlled by the computer 105, e.g., by the virtual driving controller 215. The "manual" mode is a non-autonomous mode, i.e., the vehicle 101 propulsion, braking, and steering are controlled by the human operator. The "stopped" mode is a mode in which the propulsion 120 is deactivated, i.e., the vehicle 101 is otherwise operational but does not move. That is, in the stopped mode, the operation manager 200 suppresses instructions from the human operator and/or the virtual driving controller 215 to actuate the propulsion 120 and/or to release the brake 120. When the operation manager 200 instructs the activation component 205 to transition to the fully-started mode, the operation manager 200 can identify the stopped mode as the operation mode, i.e., upon activation, the vehicle 101 begins in the stopped mode prior to transitioning into one of the manual mode or the autonomous mode. The operation manager 200 can include instructions to transition from the stopped mode to one of the manual mode or the autonomous mode. The operation manager 200 can include instructions to prevent transitioning from one of the manual mode or the autonomous mode directly to the other of the manual mode or the autonomous mode without first transitioning to the stopped mode. That is, the operation manager 200 can include instructions to transition to the stopped mode before transitioning to one of the manual mode or the autonomous mode. By transitioning to the stopped mode prior to transitioning the manual mode or the autonomous mode, the operation manager 200 only transitions to the manual mode or the autonomous mode when the vehicle 101 is stopped.

The operation manager 200 can instruct the vehicle motion controller 210 and virtual driving controller 215 to transition from the stopped mode to one of the manual mode or the autonomous mode. The operation manager 200 can arbitrate the diagnostic data from one or more components 120 and a request from a user of the vehicle 101 to identify the operation mode. For example, the operation manager 200 can collect diagnostic data from the components 120 and, upon identifying a fault in one or more of the components 120, identify the stopped mode as the operation mode. That is, if one or more of the components 120 is unable to operate, the operation manager 200 is programmed to suppress the activation request and to identify the stopped mode as the operation mode.

In another example, the operation manager 200 can identify the autonomous mode as the operation mode. The operation manager 200 can identify the autonomous mode upon receiving a request to operate the vehicle 101 in the autonomous mode (e.g., from the remote device 140, from user input to a human-machine interface (HMI), etc.) and upon determining that all components 120 necessary for autonomous operation of the vehicle 101 are powered up and ready to operate. That is, the operation manager 200 can instruct the virtual driving controller 215 to determine whether the sensors 110 and components 120 necessary for autonomous operation of the vehicle 101 are operational and ready for use. The operation manager 200 can arbitrate a received message from the virtual driving controller 215 indicating whether the sensors 110 and components 120 are ready for autonomous operation and the request from the user. The operation manager 200 can identify the autonomous mode as the operation mode when the message from the virtual driving controller 215 indicates that the sensors 110 and components 120 are ready for autonomous operation, e.g., a drive-by-wire system including an electric throttle control that controls air and fuel flow to an internal combustion engine, a brake-by-wire system that includes electromechanical actuators to activate brakes for each wheel, and/or a steer-by-wire system that includes a motor that rotates a steering rack of the vehicle 101. The operation manager 200 can then instruct the virtual driving controller 215 to transition from the stopped mode to the autonomous mode. When the message from the virtual driving controller 215 indicates a fault in one or more of the sensors 110 and/or component 120, the operation manager 200 can arbitrate the user request to transition to the autonomous mode and the message from the virtual driving controller 215 to identify the stopped mode as the operation mode and instruct the virtual driving controller 215 to remain in the stopped mode.

In another example, the operation manager 200 can identify the stopped mode as the operation mode while the current operation mode is the autonomous mode. The operation manager 200 can identify the stopped mode upon receiving a request to exit the autonomous mode (e.g., from the remote device 140, from user input to the HMI, etc.) and upon determining that the vehicle 101 speed is below a speed threshold. The speed threshold can be a predetermined value that is a resolution of a speed sensor, e.g., 0.1 miles per hour. Alternatively, the speed threshold can be a speed below which the virtual driving controller 215 can apply the brake 120 to stop the vehicle 101 without causing users in a passenger cabin to move forward, e.g., 10 miles per hour. That is, the speed threshold is determined to be nearly zero miles per hour, i.e., stopped, so that the virtual driving controller 215 can transition into the stopped mode. The operation manager 200 can arbitrate the request to exit the autonomous mode and speed data from the virtual driving controller 215 to determine whether to transition to the stopped mode. That is, if the operation manager 200 receives speed data indicating that the vehicle 101 speed is above the speed threshold, the operation manager 200 can determine to remain in the autonomous mode and instruct the virtual driving controller 215 to actuate a brake 120 to slow the vehicle 101 until the vehicle 101 speed is below the speed threshold.

In another example, the operation manager 200 can identify the manual mode as the operation mode. The operation manager 200 can identify the manual mode upon receiving a request to operate the vehicle 101 in the manual mode (e.g., from the remote device 140, from user input to the HMI, etc.) and upon determining that all components 120 necessary for manual operation of the vehicle 101 are powered up and ready to operate. That is, the operation manager 200 can request diagnostic data from the activation component 205 and/or the vehicle motion controller 210 indicating whether there are faults in the sensors 110 and components 120 used to operate the vehicle 101 in the manual mode. The operation manager 200 can arbitrate the user request and the diagnostic data to determine whether to transition to the manual mode. If the diagnostic data indicate that one or more sensors 110 and/or components 120 has a fault, the operation manager 200 can determine to ignore the user request to transition to the manual mode and remain in the stopped mode. If the diagnostic data indicate no faults, the operation manager 200 can determine to transition to the manual mode.

In another example, the operation manager 200 can identify the stopped mode as the operation mode while the current operation mode is the manual mode. The operation manager 200 can identify the stopped mode upon receiving a request to exit the manual mode (e.g., from the remote device 140, from user input to the HMI, etc.) and upon determining that the vehicle 101 speed is below a speed threshold, as described above. The operation manager 200 can arbitrate the user request to exit the manual mode and the speed data, as described above with respect to the autonomous mode, to determine whether to remain in the manual mode and instruct the vehicle motion controller 210 and/or virtual driving controller 215 to slow the vehicle 101 or to transition to the stopped mode.

The operation manager 200 can receive a request to shut down the vehicle 101, i.e., to transition the vehicle 101 to the unpowered mode. The operation manager 200 can receive the request from, e.g., the server 130, the remote device 140, user input to a power button in the passenger cabin, etc. Upon receiving the request to shut down the vehicle 101, the operation manager 200 can instruct the vehicle motion controller 210 and/or virtual driving controller 215 to transition the vehicle 101 to the stopped mode if the current operation mode is the manual mode or the autonomous mode. That is, the operation manager 200 can be programmed to shut down the vehicle 101 only when the vehicle 101 is in the stopped mode.

When the vehicle 101 is in the stopped mode, the operation manager 200 can instruct the virtual driving controller 215 to deactivate. That is, the operation manager 200 can instruct the virtual driving controller 215 to reduce or stop drawing power from the power supply 220 because the vehicle 101 will not require use of the virtual driving controller 215 upon shutting down.

When the virtual driving controller 215 has deactivated, the operation manager 200 can instruct the activation component 205 to transition from the fully-powered mode to the unpowered mode. The activation component 205 can instruct the components 120 to reduce or stop drawing power from the propulsion power supply 230 and the power supply 220. For example, the activation component 205 can instruct the ECUs to transition to the "ECU Off" state, as described above. When the ECUs are in the "ECU Off" state, the activation component 205 can reduce or stop drawing power from the power supply 220, and the vehicle 101 can transition to the unpowered mode. The operation manager 200 can maintain the vehicle 101 in the unpowered mode until receiving a request to start up the vehicle 101, as described above.

Figure 4:
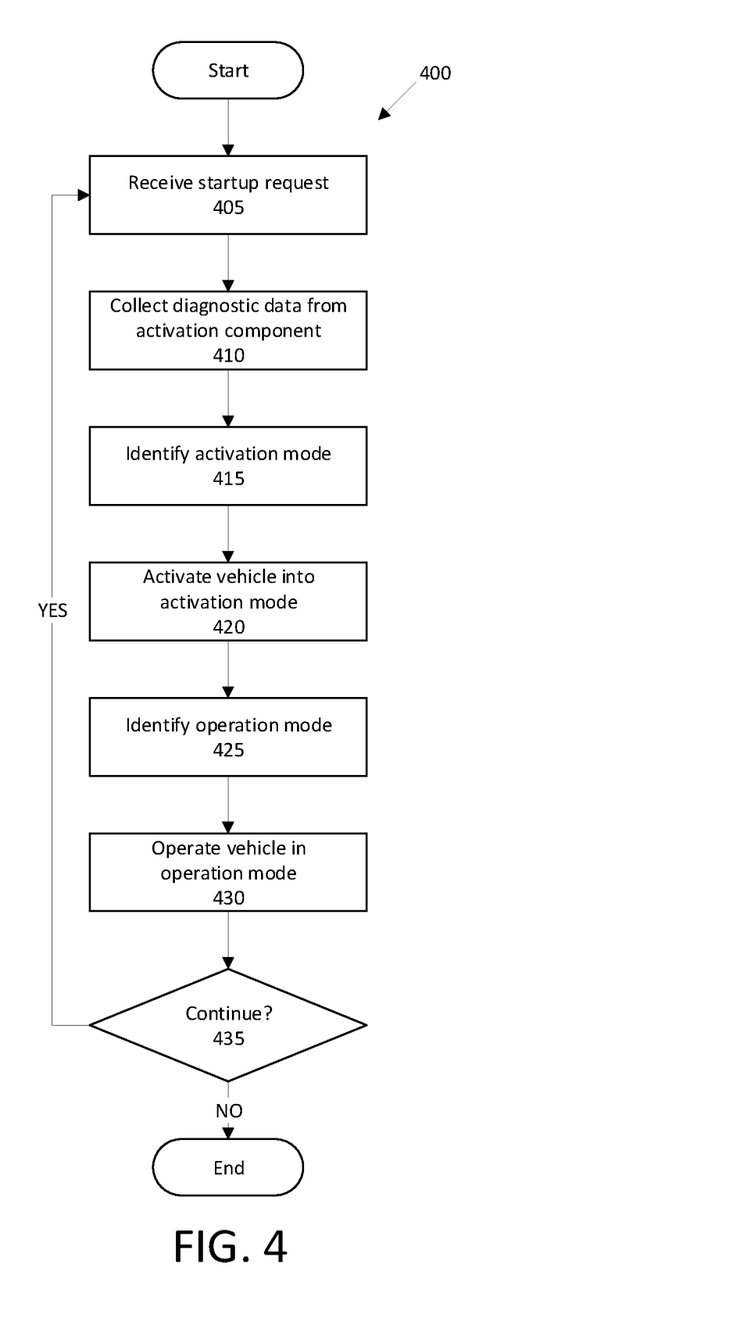
FIG. 4 is a block diagram of an example process for operating the vehicle.

FIG. 4 is a block diagram of an example process 400 for operating a vehicle 101. The process 400 begins in a block 405 in which a computer 105 of the vehicle 101 receives a startup request. The computer 105 can receive the startup request from a remote device 140, e.g., a smartphone, a keyfob, etc. The startup request provides instructions for an operation manager 200 of the computer 105 to power the vehicle 101 for use by a user.

Next, in a block 410, the operation manager 200 collects diagnostic data from an activation component 205. As described above, the activation component 205 can instruct ECUs of one or more components 120 to perform a diagnostic test to identify whether the components 120 are operational. The diagnostic test can identify a fault in one or more of the components 120, e.g., a shorted wire.

Next, in a block 415, the operation manager 200 arbitrates the diagnostic data and the request to determine an activation mode. As described above, the activation mode can be an unpowered mode, a power-up mode, or a fully-started mode. For example, the operation manager 200 can arbitrate the diagnostic data and the request and determine to transition to the power-up mode when the diagnostic data indicate no fault in a power supply 220. In another example, the operation manager 200 can determine to remain in the unpowered mode upon identifying a fault in a vehicle motion controller 210.

Next, in a block 420, the operation manager 200 instructs the activation component 205 to activate the vehicle 101 in the identified activation mode. As described above, when the activation mode is the power-up mode, the activation component 205 can instruct the vehicle motion controller 210 to actuate the ECUs of one or more components 120 to draw power from the power supply 220. By drawing power from the power supply 220, the components 120 prepare for actuation by a virtual driving controller 215.

Next, in a block 425, the operation manager 200 arbitrates diagnostic data and a user request to determine an operation mode for the vehicle 101. As described above, the operation mode can be a manual mode, a stopped mode, or an autonomous mode. For example, the operation manager 200 can identify the stopped mode as the operation mode upon transitioning from the power-up mode to the fully-started mode. In another example, the operation manager 200 can arbitrate a request from a user to operate in the autonomous mode and speed data of the vehicle 101 to identify the autonomous mode as the operation mode.

Next, in a block 430, the operation manager 200 instructs the virtual driving controller 215 to operate the vehicle 101 in the identified operation mode. For example, if the operation mode is the autonomous mode, the operation manager 200 can instruct the virtual driving controller 215 to operate one or more components 120 without input from the user. In another example, if the operation mode is the stopped mode, the operation manager 200 can instruct the virtual driving controller 215 to actuate a brake 120 to stop the vehicle 101.

Next, in a block 435, the operation manager 200 determines whether to continue the process 400. For example, the operation manager 200 can determine to continue the process 400 upon receiving additional diagnostic data from the activation component 205. If the operation manager 200 determines to continue, the process 400 returns to the block 405. Otherwise, the process 400 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computing devices discussed herein, including the computer 105 and server 130, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 400, one or more of the steps could be omitted, or the steps could be executed in a different order than shown in FIG. 4. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to:
    receive a request to activate a vehicle;
    receive diagnostic data for one or more vehicle components from an activation component;
    select only one of the request and the diagnostic data;
    select an activation mode of the vehicle that is one of an unpowered mode, a power-up mode, or a fully-started mode according to the selected one of the request and the diagnostic data while excluding the other of the request and the diagnostic data as a basis for selecting the activation mode; and
    instruct the activation component to activate one or more vehicle components associated with the selected activation mode.

2. The system of claim 1, wherein the instructions further include instructions to, upon activating the vehicle in the fully-started mode, select an operation mode of the vehicle that is one of a manual mode, an autonomous mode, or a stopped mode according to the selected one of the request and the diagnostic data while excluding the other of the request and the diagnostic data as a basis for selecting the operation mode.

3. The system of claim 2, wherein the instructions further include instructions to operate the vehicle in the stopped mode and, then, to select a second operation mode of the vehicle that is one of the manual mode or the autonomous mode based on the diagnostic data.

4. The system of claim 3, wherein the instructions further include instructions to transition from the manual mode or the autonomous mode to the stopped mode.

5. The system of claim 1, wherein the instructions further include instructions to select the activation mode based on received data from at least one of a virtual driving controller or an occupancy sensor.

6. The system of claim 1, wherein the instructions further include instructions to identify a fault in one of the vehicle components based on the diagnostic data.

7. The system of claim 1, wherein the instructions further include instructions to, upon activating the vehicle in the power-up mode, perform a diagnostic test of one or more vehicle components and, based on the diagnostic test, select an operation mode of the vehicle that is one of a manual mode, an autonomous mode, or a stopped mode.

8. The system of claim 1, wherein the instructions to select one of the request and the diagnostic data and select the activation mode further include instructions to select the unpowered mode and to ignore the request when the diagnostic data indicate a fault in one or more vehicle components.

9. The system of claim 1, wherein the instructions to select one of the request and the diagnostic data and select the activation mode further include instructions to select the power-up mode when the diagnostic data indicate no fault in the vehicle components.

10. The system of claim 1, wherein the instructions to select one of the request and the diagnostic data and select the activation mode further include instructions to select the fully-started mode when the activation component indicates that a powertrain is operational.

11. The system of claim 1, wherein the instructions to select one of the request and the diagnostic data and select the activation mode further include instructions to select the fully-started mode when the diagnostic data indicate that a propulsion power supply is operational.

12. A method, comprising:
    receiving a request to activate a vehicle;
    receiving diagnostic data for one or more vehicle components from an activation component;
    selecting only one of the request and the diagnostic data;
    selecting an activation mode of the vehicle that is one of an unpowered mode, a power-up mode, or a fully-started mode according to the selected one of the request and the diagnostic data while excluding the other of the request and the diagnostic data as a basis for selecting the activation mode; and
    instructing the activation component to activate one or more vehicle components associated with the selected activation mode.

13. The method of claim 12, further comprising, upon activating the vehicle in the fully-started mode, selecting an operation mode of the vehicle that is one of a manual mode, an autonomous mode, or a stopped mode according to the selected one of the request and the diagnostic data while excluding the other of the request and the diagnostic data as a basis for selecting the operation mode.

14. The method of claim 13, further comprising operating the vehicle in the stopped mode and, then, selecting a second operation mode of the vehicle that is one of the manual mode or the autonomous mode based on the diagnostic data.

15. The method of claim 14, further comprising transitioning from the manual mode or the autonomous mode to the stopped mode.

16. The method of claim 12, further comprising selecting the activation mode based on received data from at least one of a virtual driving controller or an occupancy sensor.

17. The method of claim 12, further comprising identifying a fault in one of the vehicle components based on the diagnostic data.

18. The method of claim 17, further comprising selecting the activation mode as the unpowered mode upon identifying the fault.

19. A system, comprising:
   a vehicle activation component;
   a virtual driver controller;
   one or more vehicle motion controllers;
   a remote device;
   means for selecting only one of an activation request from the remote device and diagnostic data from the vehicle activation component and the vehicle motion controllers; and
   means for selecting an activation mode according to the selected one of the request and the diagnostic data while excluding the other of the request and the diagnostic data as a basis for selecting the activation mode.

20. The system of claim 1, wherein the instructions further include instructions to instruct the activation component to activate the vehicle into the selected activation mode.

\* \* \* \* \*